(No Model.)
W. H. GARSON.
HERNIAL TRUSS.
No. 252,209. Patented Jan. 10, 1882.
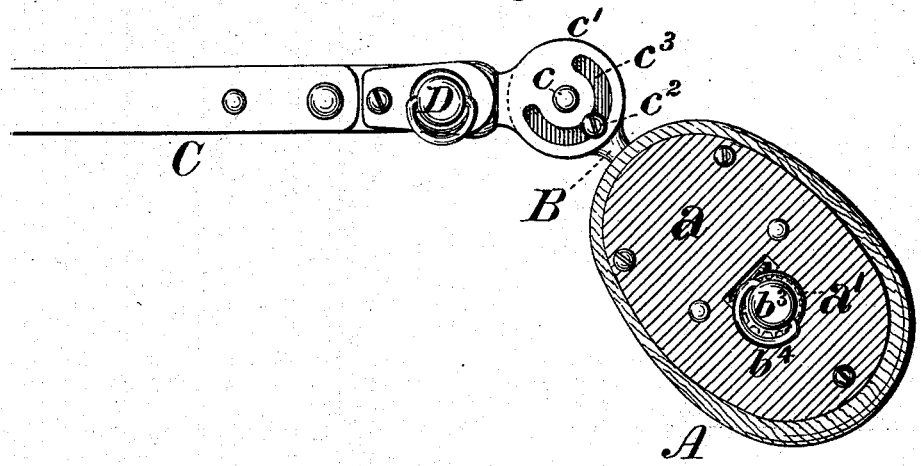
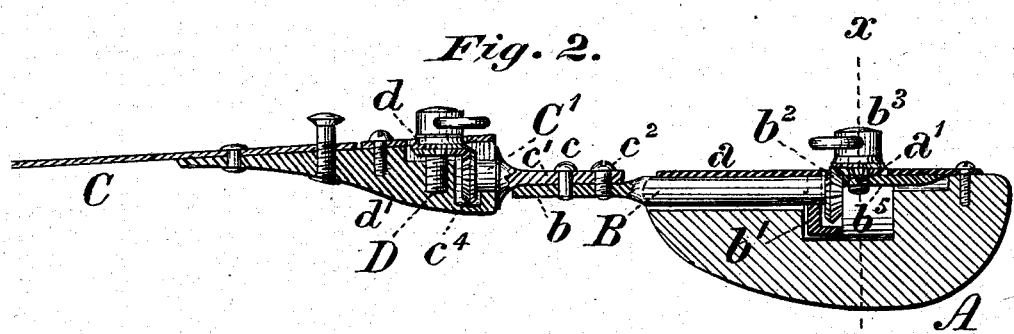
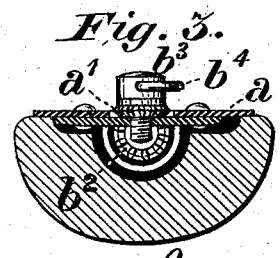
Witnesses:
Geo. B. Collier
Geo. T. Kelly
Inventor:
William H. Garson,
by Collier & Bell
Attorneys

UNITED STATES PATENT OFFICE.

WILLIAM H. GARSON, OF PHILADELPHIA, PENNSYLVANIA, ASSIGNOR TO HASTINGS & GARSON, OF SAME PLACE.

HERNIAL TRUSS.

SPECIFICATION forming part of Letters Patent No. 252,209, dated January 10, 1882.

Application filed October 29, 1881. (No model.)

*To all whom it may concern:*

Be it known that I, WILLIAM H. GARSON, of the city and county of Philadelphia, in the State of Pennsylvania, have invented certain new and useful Improvements in Hernial Trusses, of which improvements the following is a specification.

The object of my invention is to provide simple and effective means whereby the pad may be readily adjusted in desired position upon a rupture, to which end my improvements consist in certain novel devices and combinations hereinafter fully set forth.

In the accompanying drawings, Figure 1 is a front view of the pad and a portion of the body-band of a truss embodying my improvements; Fig. 2, a horizontal central section through the same, and Fig. 3 a transverse section through the pad at the line $x\ x$ of Fig. 2.

The pad A, which is of the ordinary form, is supported upon a stem, B, having its outer end formed into a flattened circular plate, $b$, which is pivoted by a stud, $c$, to a plate, $c'$, upon the outer end of the stem $C'$ of the body-band C. A screw, $c^2$, passing through a segmental slot, $c^3$, in the plate $c'$, and engaging a female thread in the plate $b$, enables the pad A and its stem B to be swung into and secured in position at any desired angle to the body-band within the range of the slot $c^3$, thereby adapting the truss to use upon either a right or a left hand rupture.

In lieu of using the slot and set-screw, the adjustment may be effected by providing one of the plates with a series of openings, and forming a pin upon the other plate to enter any one of said openings. Neither of these constructions is, however, claimed by me as new, and my invention relates specifically to means, presently to be described, for adjusting the position of the pad relatively to its stem and to the body-band.

The pad-stem B is fitted freely in a bearing, $b'$, secured to the inner side of the face-plate $a$ of the pad, so that the pad may be moved wholly or partially, as desired, around the axis of the stem B. A bevel-gear, $b^2$, secured upon the inner end of the stem B, meshes with a similar gear, $a'$, mounted loosely upon an adjusting-screw, $b^3$, which passes through an opening in the face-plate $a$ and engages a nut, $b^5$, secured to the inner side of said plate. A ring, $b^4$, is attached to the head of the adjusting-screw to enable it to be readily turned in either direction, as required. By slackening the adjusting-screw $b^3$ the pad A may be turned into any desired position upon the stem B, and can be there secured by tightening the screw, so as to lock the gears $b^2$ and $a'$ together, and thereby prevent the further rotation of the pad upon its stem. Adjustability of the pad and stem relatively to the body-band is effected in a similar manner by the provision of an adjusting-screw, D, carrying a loose bevel-gear, $d$, and engaging a nut, $d'$, secured to the end of the body-band C. The body-band stem $C'$ has upon its inner end a bevel-gear, $c^4$, which meshes with the gear $d$ of the adjusting-screw. Upon slackening the screw D the stem $C'$ may be turned within its bearing in the end lug of the body-band, and can be locked fast therein through the gears $d$ and $c^4$ by the tightening of the screw D.

I am aware that trusses in which the pad is adjustable upon its stem and the stem of the body-band is separately adjustable relatively to said band have been heretofore known, and do not therefore broadly claim mechanism for effecting such adjustments.

I claim as my invention and desire to secure by Letters Patent—

In a hernial truss, the combination of a stem fitting freely in a bearing, a bevel-gear secured upon said stem, an adjusting-screw engaging a nut connected rigidly with the bearing of the stem, and a bevel-gear mounted loosely on said adjusting-screw and meshing with the gear of the stem, these members being combined for joint operation, so that the stem may be either held fast in or allowed axial movement within its bearing, substantially as set forth.

WM. H. GARSON.

Witnesses:
J. SNOWDEN BELL,
WALTER S. GIBSON.